(12) United States Patent
Yuasa

(10) Patent No.: US 9,956,884 B2
(45) Date of Patent: May 1, 2018

(54) VEHICLE

(71) Applicant: TOYOTA JIDOSHA KABUSHIKI KAISHA, Toyota-shi, Aichi-ken (JP)

(72) Inventor: Hiroaki Yuasa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 67 days.

(21) Appl. No.: 15/211,223

(22) Filed: Jul. 15, 2016

(65) Prior Publication Data

US 2017/0036552 A1    Feb. 9, 2017

(30) Foreign Application Priority Data

Aug. 7, 2015  (JP) ................................. 2015-156839

(51) Int. Cl.
  *B60L 11/18*  (2006.01)
  *H01F 38/14*  (2006.01)
  *H02J 50/10*  (2016.01)

(52) U.S. Cl.
  CPC ............ *B60L 11/182* (2013.01); *H01F 38/14* (2013.01); *H02J 50/10* (2016.02); *Y02T 10/7005* (2013.01); *Y02T 10/7072* (2013.01); *Y02T 90/122* (2013.01); *Y02T 90/14* (2013.01)

(58) Field of Classification Search
  CPC ........ B60L 11/182; H02J 50/10; H01F 38/14; Y02T 90/122; Y02T 90/14; Y02T 10/7072; Y02T 10/7005
  See application file for complete search history.

(56) References Cited

U.S. PATENT DOCUMENTS

| | | |
|---|---|---|
| 7,741,734 B2 | 6/2010 | Joannopoulos et al. |
| 2007/0222542 A1 | 9/2007 | Joannopoulos et al. |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |

(Continued)

FOREIGN PATENT DOCUMENTS

| | | |
|---|---|---|
| AU | 2006269374 B2 | 1/2007 |
| AU | 2007349874 A2 | 10/2008 |

(Continued)

*Primary Examiner* — Jared Fureman
*Assistant Examiner* — Michael Warmflash
(74) *Attorney, Agent, or Firm* — Oliff PLC

(57) ABSTRACT

A vehicle includes a power reception device which receives electric power from a power transmission device in a non-contact manner. The power reception device can be mounted on a bottom surface side of the vehicle. An accommodation space of the power reception device is defined between a base and a protective cover. Within the apparatus accommodation space of the power reception device is a frame that has a plurality of radial ribs extending radially from a center of the frame toward an outer peripheral portion of the frame. In addition, a side of an apparatus within the accommodation space closer to the vehicle abuts on the base, and a side of the apparatus opposite to the vehicle abuts on the protective cover.

7 Claims, 7 Drawing Sheets

(56) References Cited

U.S. PATENT DOCUMENTS

| | | |
|---|---|---|
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2013/0127409 A1 | 5/2013 | Ichikawa |
| 2013/0193749 A1 | 8/2013 | Nakamura et al. |
| 2014/0232331 A1 | 8/2014 | Stamenic et al. |
| 2014/0305722 A1 | 10/2014 | Ichikawa et al. |
| 2015/0069964 A1 * | 3/2015 | Kamikihara .......... B60L 11/182 320/108 |
| 2016/0322856 A1 * | 11/2016 | Rejman ................. H02J 7/0042 |
| 2017/0040098 A1 * | 2/2017 | Yuasa ....................... H01F 3/10 |

FOREIGN PATENT DOCUMENTS

| | | | |
|---|---|---|---|
| AU | 2010200044 A1 | 1/2010 | |
| AU | 2006269374 C1 | 3/2010 | |
| CA | 2 615 123 A1 | 1/2007 | |
| CA | 2 682 284 A1 | 10/2008 | |
| CN | 101258658 A | 9/2008 | |
| CN | 101682216 A | 3/2010 | |
| CN | 101860089 A | 10/2010 | |
| EP | 1 902 505 A2 | 3/2008 | |
| EP | 2 130 287 A1 | 12/2009 | |
| IN | 735/DELNP/2008 | 5/2008 | |
| IN | 6195/DELNP/2009 | 7/2010 | |
| JP | 2009-501510 A | 1/2009 | |
| JP | 2012-089618 A | 5/2012 | |
| JP | 2013-110822 A | 6/2013 | |
| JP | 2013-126327 A | 6/2013 | |
| JP | 2013-146148 A | 7/2013 | |
| JP | 2013-146154 A | 7/2013 | |
| JP | 2013-154815 A | 8/2013 | |
| JP | 2014-043115 A | 3/2014 | |
| KR | 2008-0031398 A | 4/2008 | |
| KR | 2010-0015954 A | 2/2010 | |
| WO | 2007/008646 A2 | 1/2007 | |
| WO | 2008/118178 A1 | 10/2008 | |
| WO | WO 2011112795 A1 * | 9/2011 | ............ B60L 11/182 |
| WO | 2013/076870 A1 | 5/2013 | |
| WO | 2013/108108 A2 | 7/2013 | |
| WO | 2015/090899 A1 | 6/2015 | |

* cited by examiner

VEHICLE

This nonprovisional application is based on Japanese Patent Application No. 2015-156839 filed on Aug. 7, 2015 with the Japan Patent Office, the entire contents of which are hereby incorporated by reference.

BACKGROUND

Technical Field

The present disclosure relates to a vehicle equipped with a power reception device which receives electric power from a power transmission device in a non-contact manner.

Description of the Background Art

Conventionally, non-contact power transfer systems which transmit electric power from a power transmission device to a power reception device in a non-contact manner have been disclosed in Japanese Patent Laying-Open Nos. 2013-154815, 2013-146154, 2013-146148, 2013-110822, 2013-126327, and WO2013/76870. The power transmission device includes a power transmission coil, and the power reception device includes a power reception coil.

In a vehicle described in WO2013/76870, the power reception device is arranged on a bottom surface of the vehicle.

A situation is assumed where a stone directly impinges on the power reception device while the vehicle is traveling along a stony road. It is also assumed that, in some cases, the weight of the vehicle may be applied to the power reception device. When such a situation is assumed, it is preferable to improve the strength of the power reception device.

SUMMARY

In view of the aforementioned problems, one object of the present disclosure is to provide a vehicle equipped with a power reception device having a structure with an increased rigidity as a whole in order to make the power reception device less damaged even when an external force is applied to the power reception device.

The vehicle includes a power reception device, disposed on a bottom surface side of the vehicle, the power reception device configured to receive electric power from a power transmission device in a non-contact manner. The power reception device includes a base arranged on the bottom surface side of the vehicle, a protective cover arranged to form an apparatus accommodation space between the base and the protective cover, a frame arranged in the apparatus accommodation space and provided with an open region at a center of the frame, a first side of the frame facing toward the base, a second opposite side of the frame facing toward the protective cover, a power reception coil provided on the second side of the frame and in the apparatus accommodation space and surrounding the open region, and an apparatus arranged in the open region and in the apparatus accommodation space. The frame has a plurality of radial ribs extending radially from the center of the frame toward an outer peripheral portion of the frame, and a first side of the apparatus closer to the vehicle abuts on the base, and a second side of the apparatus opposite to the first side of the apparatus abuts on the protective cover.

According to the above configuration, when an external force is applied to a central portion of the power reception device, the external force applied to the protective cover can be received by the apparatus, because an upper side of the apparatus abuts on the base and a lower side thereof abuts on the protective cover. As a result, deformation of the protective cover at the central portion of the power reception device can be prevented.

Further, since the frame is provided with the plurality of radial ribs extending radially from the center toward the outer peripheral portion, deflection of the power reception device can be prevented even when a load is applied to the power reception device. Furthermore, since the frame is provided with the radial ribs, the frame has an increased rigidity, and the power reception device as a whole can also have an increased rigidity.

Accordingly a vehicle can be provided with a power reception device having a structure with an increased rigidity as a whole in order to make the power reception device less damaged even when an external force is applied to the power reception device.

The foregoing and other objects, features, aspects and advantages of the present disclosure will become more apparent from the following detailed description when taken in conjunction with the accompanying drawings.

DESCRIPTION OF PREFERRED EMBODIMENTS

Figure 1:
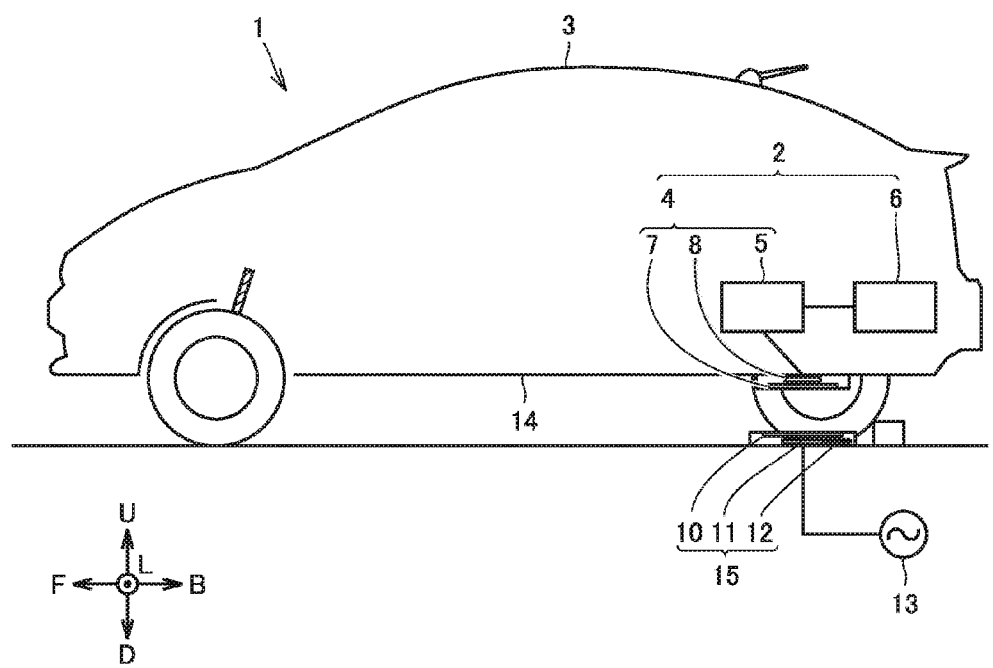
FIG. 1 is a view schematically showing a non-contact charging system in the present embodiment.

Hereinafter, an embodiment that is one example of the present disclosure will be described with reference to the drawings. When a number, amount, or the like is referred to in the embodiment described below, the scope of the present disclosure is not necessarily limited to such a number, amount, or the like, unless otherwise specified. Identical or corresponding parts will be designated by the same reference numerals, and the description thereof may not be repeated. It is intended to combine features of the embodiment as appropriate for use. In the drawings, elements are not drawn to scale, and some of them are drawn with a different scale to facilitate the understanding of the structure.

In each drawing used below, the direction indicated by an arrow F in the drawing indicates the direction in which a vehicle moves forward, the direction indicated by an arrow B indicates the direction in which the vehicle moves backward, the direction indicated by an arrow U indicates the upward direction of the vehicle, the direction indicated by an arrow D indicates the downward direction of the vehicle, and a direction L perpendicular to the paper plane (of FIG.

1) indicates a vehicle width direction which is the left-right direction of the vehicle orthogonal to the front-back direction of the vehicle.

FIG. 1 is a view schematically showing a non-contact charging system 1. As shown in FIG. 1, non-contact charging system 1 includes a vehicle 3 including a power reception unit 2, and a power transmission device 15.

Power reception unit 2 includes a power reception device 4 provided on a bottom surface 14 side of vehicle 3, and a battery pack 6 including batteries which store direct current (DC) power. Power reception device 4 includes a power reception coil 7, a capacitor 8, a filter circuit 9, and a rectifier (filter) 5 which converts alternating current (AC) power into DC power. Filter circuit 9 includes coils 91 and a capacitor 92. Further, each coil 91 includes a highly rigid coil core 91a and a coil wire 91b wound around coil core 91a (see FIGS. 5 and 7). Power transmission device 15 includes a power transmission coil 10, a capacitor 11, and a frequency converter 12, and power transmission device 15 is connected to a power source 13.

Figure 2:
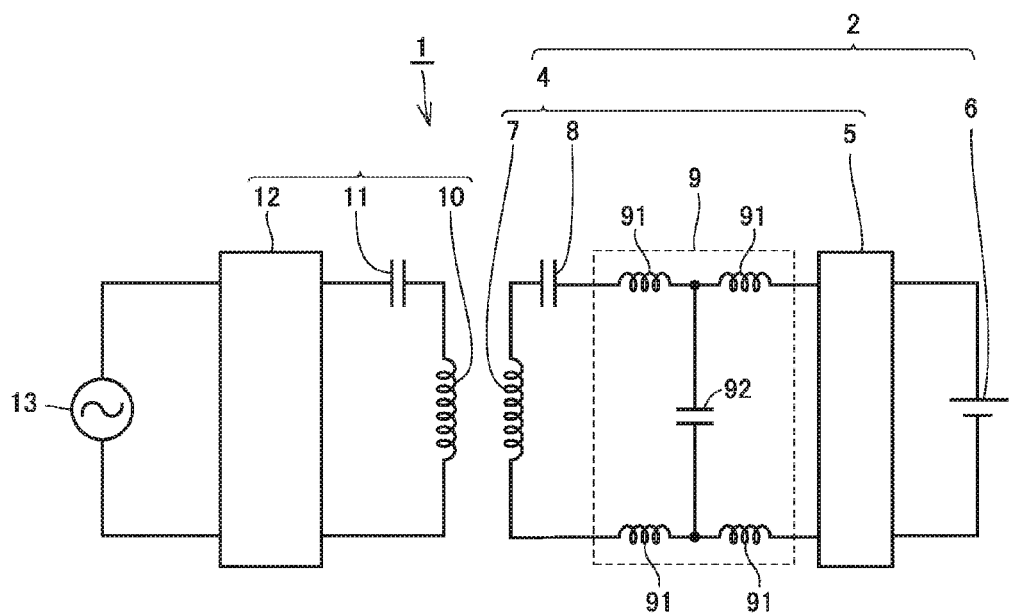
FIG. 2 is a circuit diagram schematically showing a circuit of the non-contact charging system in the present embodiment.

FIG. 2 is a circuit diagram schematically showing a circuit of non-contact charging system 1. As shown in FIG. 2, capacitor 8 is connected in series to power reception coil 7, and a serial LC resonance circuit is formed by power reception coil 7 and capacitor 8. Capacitor 11 is connected in series to power transmission coil 10, and a serial LC resonance circuit is formed by power transmission coil 10 and capacitor 11.

These resonance circuits are formed such that the resonance frequency of the resonance circuit constituted by power transmission coil 10 and capacitor 11 is identical or substantially identical to the resonance frequency of the resonance circuit constituted by power reception coil 7 and capacitor 8.

These resonance circuits are also formed such that both the Q value of the resonance circuit constituted by power transmission coil 10 and capacitor 11 and the Q value of the resonance circuit constituted by power reception coil 7 and capacitor 8 are more than or equal to 100.

Thus, by constituting the resonance circuit on the power transmission side and the resonance circuit on the power reception side as described above, electric power can be transferred highly efficiently even when there is a distance between power reception device 4 and power transmission device 15.

Figure 3:
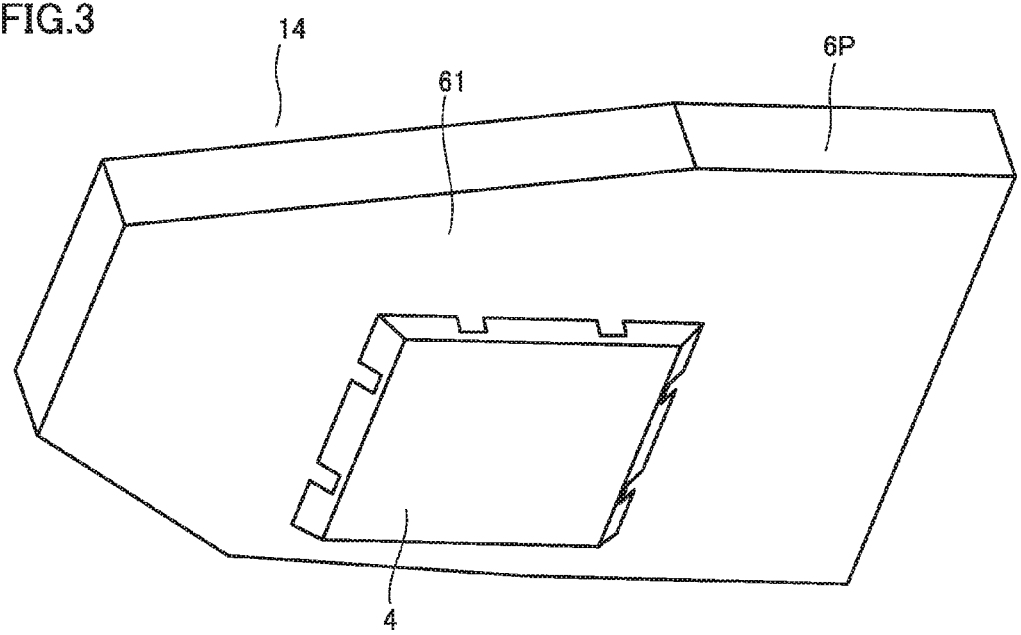
FIG. 3 is a view looking up toward a bottom surface side of a vehicle, showing the arrangement of a power reception device in the present embodiment.

FIG. 3 is a view looking up toward the bottom surface 14 side of vehicle 3, showing arrangement of power reception device 4. In the present embodiment, power reception device 4 is fixed on a flat surface 61 of a battery pack 6P provided on bottom surface 14 of vehicle 3, using bolts or the like (not shown). Thus, by fixing power reception device 4 on the flat surface, generation of an unnecessary bending stress in power reception device 4 can be avoided.

(Configuration of Power Reception Device 4)

Figure 4:
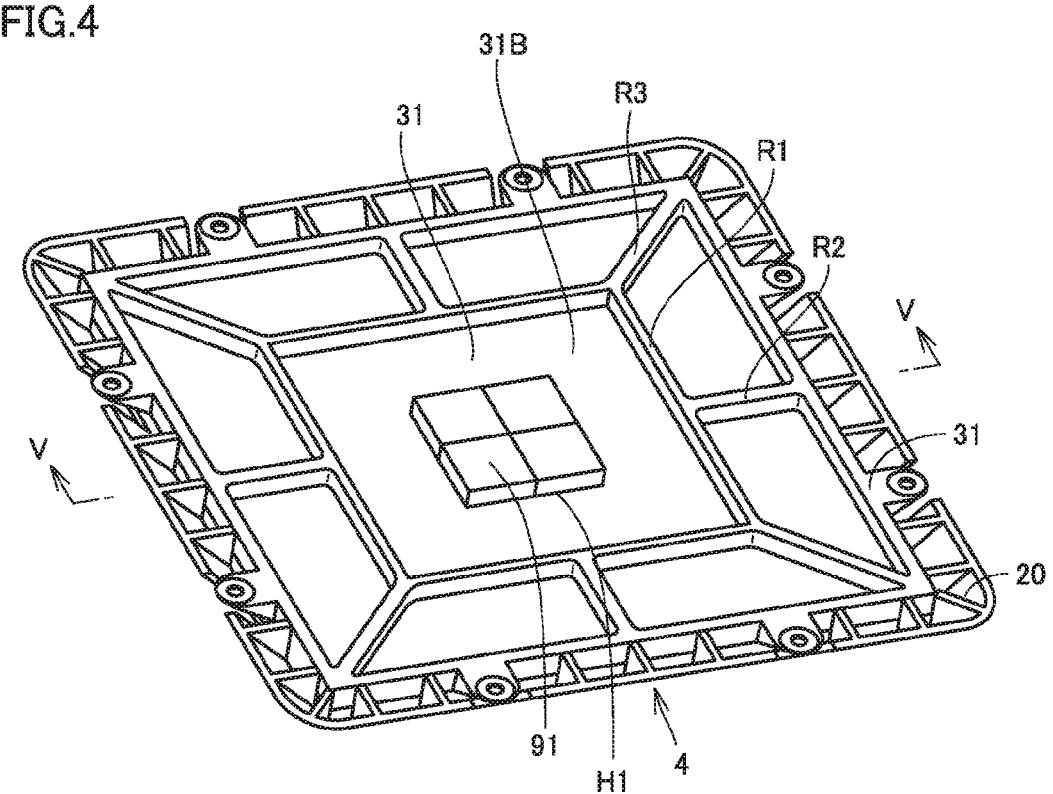
FIG. 4 is a perspective view showing an internal structure of the power reception device in the present embodiment viewed from the vehicle side.

Next, a configuration of power reception device 4 will be described with reference to FIGS. 4 to 6. FIG. 4 is a perspective view showing an internal structure of power reception device 4 viewed from a vehicle 3 side, FIG. 5 is a side cross sectional view taken along a line V-V in FIG. 4 and viewed in the direction of arrows, and FIG. 6 is a perspective view showing configurations of a ferrite core and a supporting member provided to power reception device 4.

Figure 5:
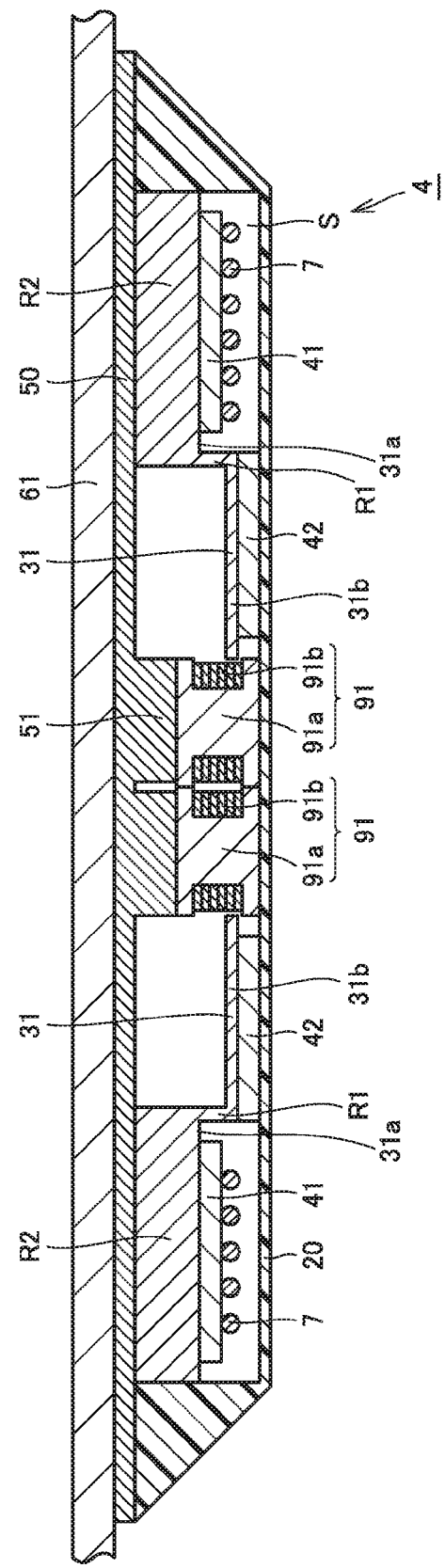
FIG. 5 is a side cross sectional view taken along a line V-V in FIG. 4 and viewed in the direction of arrows.
Figure 6:
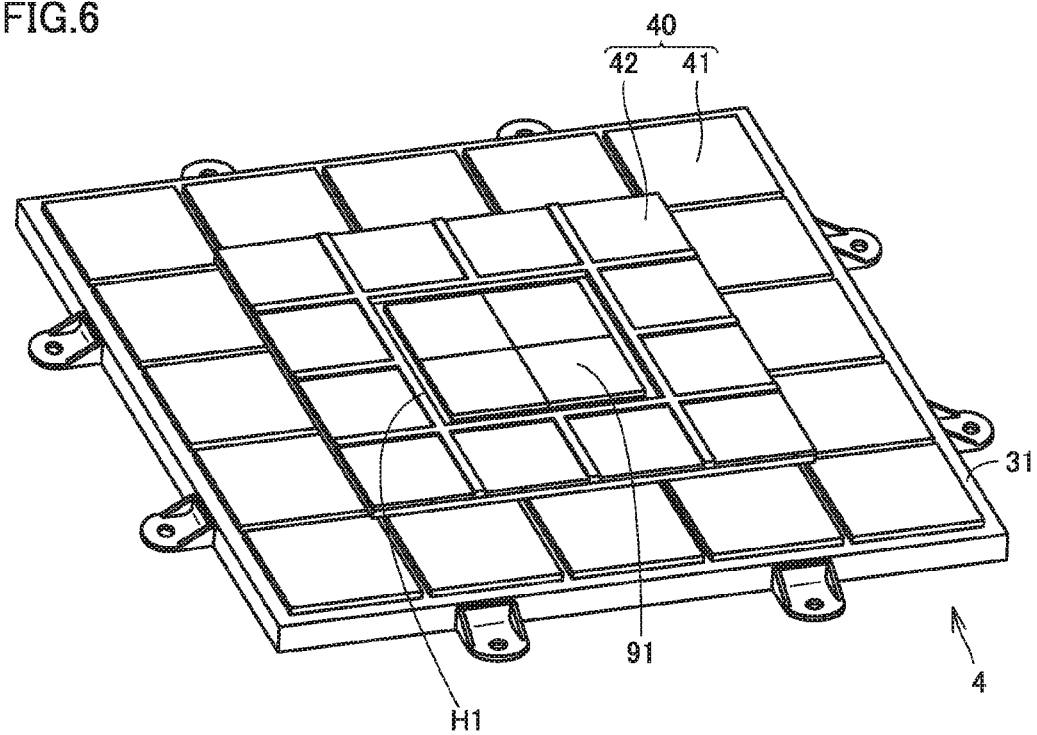
FIG. 6 is a perspective view showing configurations of a ferrite core and a supporting member provided to the power reception device in the present embodiment.

Referring to FIGS. 4 and 5, power reception device 4 in the present embodiment includes a base 50 arranged on a side closer to vehicle 3, and a protective cover 20 arranged to define an apparatus accommodation space S between base 50 and protective cover 20. In FIG. 4, base 50 is not shown for convenience of description. Base 50 is formed of a metal material such as aluminum, and protective cover 20 is formed of a resin material.

In apparatus accommodation space S are arranged a frame 31, and a ferrite core 40, power reception coil 7, and an apparatus on a side of frame 31 opposite to vehicle 3. In the present embodiment, four highly rigid coils 91 used for filter circuit 9 are arranged as the apparatus. It should be noted that a highly rigid apparatus constituting another power reception device may be arranged as the apparatus. Frame 31 is formed of a metal material such as aluminum.

As shown well in FIG. 4, a penetrated region (open region) H1 through which coils 91 can pass is provided at a substantially central region of frame 31. Further, frame 31 has a plurality of radial ribs R2, R3 extending radially from the center toward end portions. Radial ribs R2, R3 are linearly provided to rise from a base surface 31B of frame 31.

More preferably, frame 31 includes an annular rib R1 arranged to surround penetrated region H1 and overlap with ferrite core 40 when viewed in a plan view, and the plurality of radial ribs R2, R3 described above are provided to extend outward from annular rib R1. Annular rib R1 is also linearly provided to rise from base surface 31B of frame 31.

Further, the numbers and the positions of radial ribs R2, R3 can be changed as appropriate in accordance with the strength (rigidity) required, as long as they are formed to extend radially from a central portion.

Referring to FIG. 6, ferrite core 40 in the present embodiment includes an outer annular ferrite core 41 arranged outside and an inner annular ferrite core 42 arranged inside, to surround coils 91 (penetrated region H1) arranged at the center. Each of outer annular ferrite core 41 and inner annular ferrite core 42 is constituted by combining a plurality of separate rectangular ferrite cores.

Outer annular ferrite core 41 is supported by a first step portion 31a provided to frame 31, and inner annular ferrite core 42 is supported by a second step portion 31b located inside first step portion 31a provided to frame 31. First step portion 31a and second step portion 31b are formed to have different distances from base 50, and first step portion 31a is provided at a position closer to base 50 and second step portion 31b is provided at a position farther from base 50. Thereby, second step portion 31b constitutes a region protruding from first step portion 31a, and power reception coil 7 is wound on outer annular ferrite core 41 to surround penetrated region H1.

Referring to FIG. 5 again, in the present embodiment, a side of coil core 91a of each coil 91 closer to vehicle 3 abuts on base 50, and a side thereof opposite to vehicle 3 abuts on protective cover 20, in the upward/downward direction of the vehicle. Specifically, base 50 is provided with a protruding portion 51 protruding toward coils 91, and protruding portion 51 directly abuts on coil core 91a. It should be noted that, in the present embodiment, protective cover 20 is in contact with inner annular ferrite core 42.

As described above, according to power reception device 4 in the present embodiment, when an external force is applied to the central portion of power reception device 4, the external force applied to protective cover 20 can be received by coils 91, because a side of highly rigid coils 91 closer to vehicle 3 abuts on the base 50, and a side thereof opposite to vehicle 3 abuts on protective cover 20 as shown in FIG. 5. As a result, deformation of protective cover 20 at the central portion of power reception device 4 can be prevented.

Further, since frame 31 is provided with the plurality of radial ribs R2, R3 extending radially from the center toward the end portions (outer peripheral portion), deflection of power reception device 4 can be prevented and breakage of ferrite core 40 can be prevented even when a load is applied to power reception device 4.

In particular, since annular rib R1 is arranged to overlap with inner annular ferrite core 42 in the present embodiment, inner annular ferrite core 42 can be supported by annular rib R1 and breakage of inner annular ferrite core 42 can be prevented even when an external force (in particular, bending stress) is applied to the region of inner annular ferrite core 42.

Further, since frame 31 is provided with radial ribs R2, R3, frame 31 has an increased rigidity, and can support both inner annular ferrite core 42 and outer annular ferrite core 41. In particular, although stress tends to concentrate on corner portions, it is also possible to counteract the stress by providing radial ribs R3 at these portions. Thereby, power reception device 4 as a whole can have an increased rigidity.

It should be noted that, although frame 31 is provided with annular rib R1 and radial ribs R2, R3 in the embodiment described above, the rigidity of frame 31 can also be increased by providing at least radial ribs R2, R3. Accordingly, a configuration without annular rib R1 can also be adopted. On the other hand, a plurality of annular ribs R1 may be provided, in addition to radial ribs R2, R3.

Figure 7:
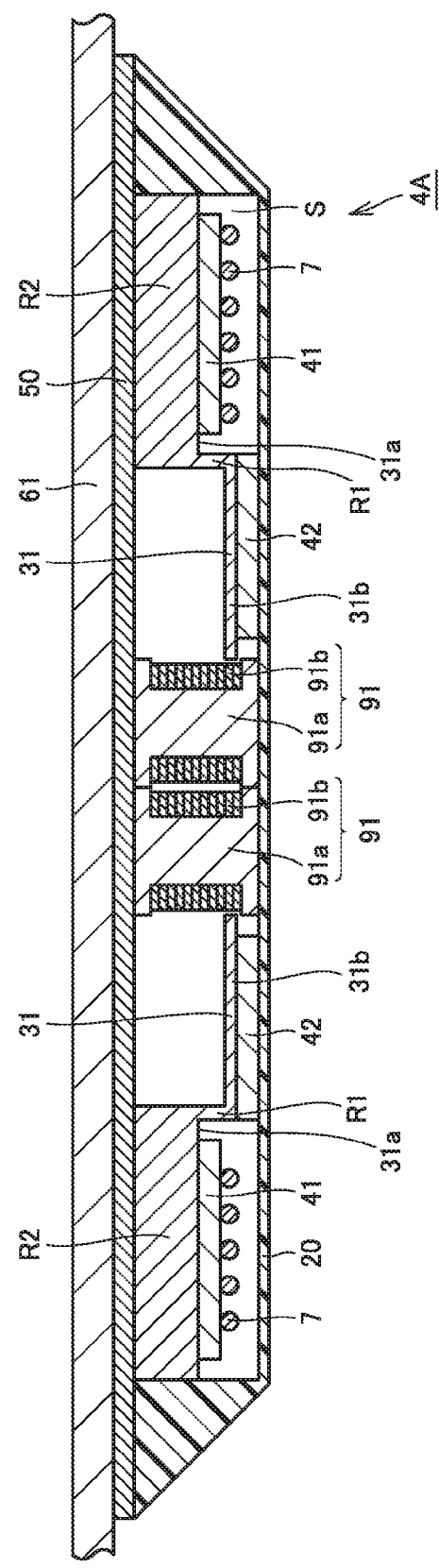
FIG. 7 is a view showing another structure of the power reception device in the present embodiment.

It should be noted that, although the configuration in which base 50 is provided with protruding portion 51 protruding toward coils 91 is adopted in the embodiment described above, for example, a configuration in which the upper side of coils 91 directly abuts on base 50 without providing base 50 with protruding portion 51 as shown in FIG. 7 may be adopted, depending on the size of coils 91.

Further, although the opening shape of penetrated region H1 is rectangular and the shape of annular rib R1 is also rectangular because the contour shape of coils 91 is rectangular in the present embodiment, the opening shape of penetrated region H1 can be circular and the shape of annular rib R1 can also be circular.

Further, the position where power reception device 4 is to be fixed is not limited to flat surface 61 of battery pack 6P provided on bottom surface 14 of vehicle 3. For example, when a flat portion is provided on bottom surface 14 of vehicle 3, power reception device 4 may be fixed to the flat portion.

Further, although a quadrangle is adopted as an annular shape in ferrite core 40 in the present embodiment, the annular shape is not limited to this contour shape, and may be a circular shape or a polygonal shape.

Although embodiments have been described, it should be understood that the embodiments disclosed herein are illustrative and non-restrictive.

What is claimed is:

1. A vehicle comprising a power reception device, disposed on a bottom surface side of the vehicle, the power reception device configured to receive electric power from a power transmission device in a non-contact manner, the power reception device including:
    a base arranged on the bottom surface side of the vehicle,
    a protective cover which defines an apparatus accommodation space between the base and the protective cover,
    a frame arranged in the apparatus accommodation space and provided with an open region at a center of the frame, a first side of the frame facing toward the base, a second opposite side of the frame facing toward the protective cover,
    a power reception coil provided on the second side of the frame and in the apparatus accommodation space and surrounding the open region, and
    an apparatus arranged in the open region and in the apparatus accommodation space,
    wherein
    the frame has a plurality of radial ribs extending radially from the center toward an outer peripheral portion of the frame, and
    a first side of the apparatus closer to the vehicle abuts on the base and a second side of the apparatus opposite to the first side of the apparatus abuts on the protective cover.

2. The vehicle according to claim 1, wherein
    the power reception device further includes a ferrite core,
    the frame includes an annular rib that surrounds the open region and overlaps with the ferrite core when viewed in a plan view, and
    the plurality of radial ribs extend outward from the annular rib.

3. The vehicle according to claim 1, wherein the apparatus is a filter circuit coil.

4. The vehicle according to claim 1, wherein
    a battery pack is arranged on the bottom surface side of the vehicle, and
    the base is arranged on the battery pack.

5. The vehicle according to claim 1, wherein the base includes a protruding portion at a central region of the base, and the first side of the apparatus abuts on the protruding portion.

6. The vehicle according to claim 1, wherein
    the power reception device further includes an inner ferrite core that surrounds the open region, and an outer ferrite core that surrounds the inner ferrite core,
    the frame includes a first step portion on which the inner ferrite core is mounted, and a second step portion on which the outer ferrite core is mounted, and
    the first step portion protrudes relative to the second step portion so as to be farther from the base than the second step portion.

7. The vehicle according to claim 6, wherein the power reception coil is disposed over the outer ferrite coil.

* * * * *